Feb. 5, 1963  H. NEUWIRTH  3,076,645
EASEL CLAMP
Filed May 10, 1961

INVENTOR
HERMAN NEUWIRTH
BY Blum, Moscovitz,
Friedman and Blum
ATTORNEYS.

United States Patent Office 3,076,645
Patented Feb. 5, 1963

3,076,645
EASEL CLAMP
Herman Neuwirth, Fort Lee, N.J., assignor to Testrite Instrument Co., Inc., Newark, N.J., a corporation of New York
Filed May 10, 1961, Ser. No. 109,103
5 Claims. (Cl. 269—154)

This invention relates to easel clamps for releasably suspending flat work from an easel. More particularly, the invention relates to an easel clamp which is characterized by improved ease of operation and improved frictional holding effect.

The usual easel comprises an upright supporting arrangement, which is generally of the tripod type, and is constructed to support a placard or other substantially flat work either directly or by means of an extension arm. In the extension arm type of easel, an upright member extending adjustably upward from the tripod structure has an extension arm adjustably clamped thereto adjacent its upper end, and the free end of this extension arm carries suitable means for securing and suspending a placard or other flat work in spaced relation to the easel supporting body. The present invention is directed to an improved and simplified construction of a clamp for such an extension arm.

For an understanding of the principles of the invention, reference is made to the following description of a typical embodiment thereof as illustrated in the accompanying drawings. In the drawings.

Figure 1:
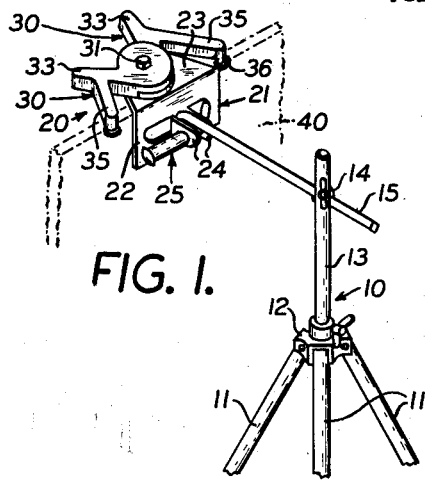
FIG. 1 is a perspective view of the upper portion of a tripod easel having an extension arm provided with the invention clamp.

Referring to FIG. 1, a tripod type of easel 10 is illustrated as including tripod legs 11 pivotally connected to a fitting 12 from which extends a substantially vertical support rod 13. An extension arm support fitting 14, preferably one designed to permit angular adjustment of the arm, is provided near the upper end of post 13 and has secured therein an extension arm 15 to the outer end of which is adjustably secured a clamp 20 embodying the present invention. Through the medium of the upper fitting 14, arm 15 is angularly adjustable relative to rod 13. The outer end of this arm, which is preferably a polygonal cross-section rod, is bent or otherwise formed to provide a loop for attachment of the clamp 20.

Figure 3:
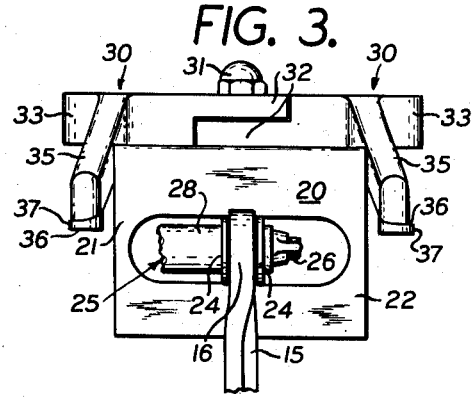
FIG. 3 is a rear elevational view of the clamp.
Figure 6:
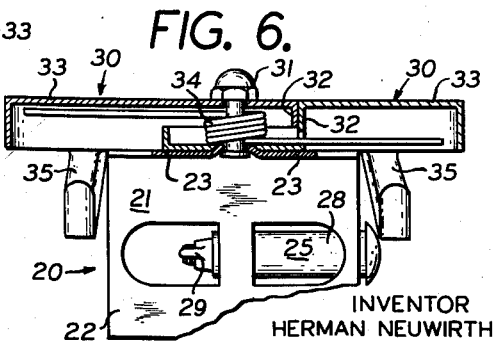
FIG. 6 is a view taken on the line 6—6 of FIG. 2.

Clamp 20 includes a bracket 21 which is preferably a right angle bracket having a normally depending leg 22 and a normally horizontal leg 23. Ears 24 are cut and bent from leg 22, as best seen in FIGS. 1, 3 and 6, and are apertured to receive a bolt 26 forming part of attaching means generally indicated at 25. Bolt 26 has a head 27 which has a polygonal enlargement (not shown) fitting into a correspondingly shaped aperture in an ear 24 to keep the bolt from turning, the bolt also extending through a circular aperture in the other ear. Beyond this other ear, a tubular sleeve 28 surrounds the bolt 26 and a washer is placed against the end of this sleeve for bearing engagement with a thumb nut 29 which serves to compress the ears 24 against the loop of arm 15 to hold the clamp in adjusted angular position on the extension arm.

Figure 2:
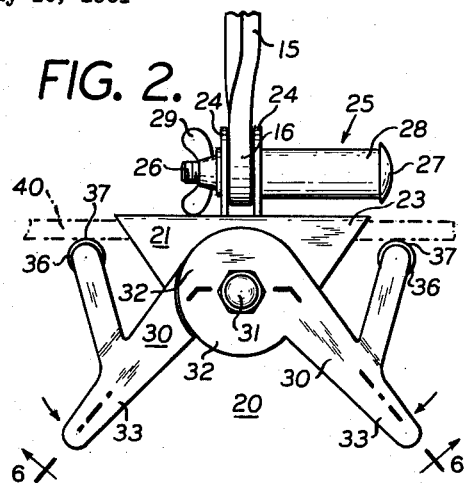
FIG. 2 is a top plan view of the clamp and its attachment to the easel extension arm.
Figure 4:
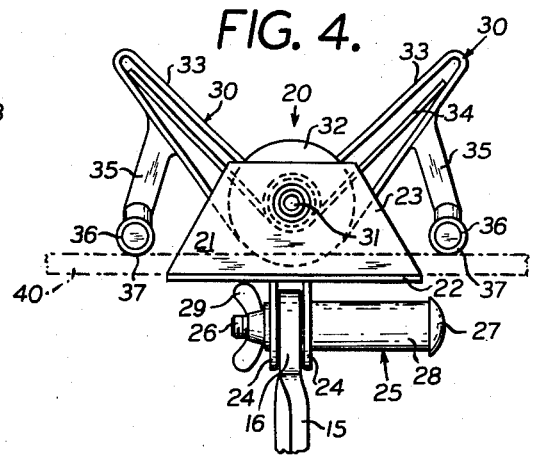
FIG. 4 is a bottom plan view of the clamp.
Figure 5:
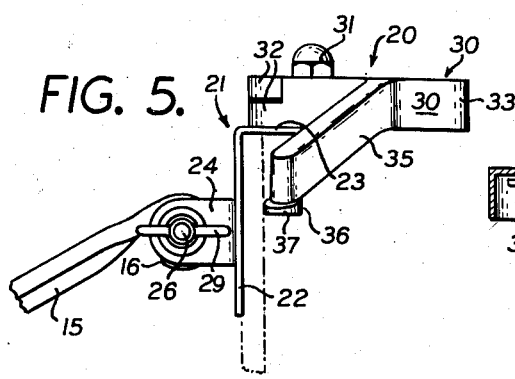
FIG. 5 is a side elevational view of the clamp.

The normally horizontally extending leg 23 of bracket 21 is apertured to receive a bolt-and-nut, rivet, or pin assembly 31 which pivotally connects a pair of clamping arms 30 to leg 23. Clamping arms 30 are designed to cooperate with leg 22 of bracket 21 to clamp relatively flat work 40 between leg 22 and arms 30, as illustrated in FIGS. 1, 2 and 4. Arms 30 are essentially mirror copies of each other, and each arm includes an inner circular end 32 which, in the case of one arm, is hollow in a direction toward the leg 23 and, in the case of the other arm, is hollow in a direction away from the leg 23. The two inner ends 32 overlap each other at their pivotal junction, as best seen in FIGS. 1 and 3. Each circular inner end 32 has an axial length which is equal to substantially one-half the overall thickness of the respective arm.

An outwardly tapering arm 33 extends tangentially from each circular pivot portion 31, these arms 33 being the full height of the clamping arms 30 and forming, interiorly, hollow continuations of the hollow spaces of the respective pivot portions 31, as best seen in FIGS. 4 and 6. A coil spring 34 is disposed within the housing formed by the facing hollow portions of the circular pivot portions 31, and is coiled around the pivot 31. The two ends of this coil spring, as best seen in FIGS. 4 and 6, extend outwardly into the arms 33, and the disposition of the coil spring is such that it tends to rotate the arms 30 in a direction to separate their outer ends.

An extension 35 projects outwardly and downwardly from the outer surface of each arm 33, intermediate its outer and inner ends and nearer to the outer end. Extensions 35 are preferably solid, and make an acute angle with the inner end of each arm 33 and an obtuse angle with the outer end of each arm 33, as best seen in FIGS. 2 and 4. The downward slope of each extension 35 is such that its free end is at a level somewhat below that of the normally horizontal leg 23 of bracket 21. The free end of each extension 35 is provided with a downwardly extending cylindrical abutment 36 whose axis is substantially parallel to the plane of leg 22 of bracket 21. The radius of the abutments 36 is somewhat larger than the radius of curvature of the free ends of extension 35 so that abutments 36, over a major portion of their periphery, project somewhat beyond the free ends of extension 35, as indicated at 37. The coil spring 34 biases the clamping arms 30 in such a direction that these cylindrical protrusions 36, and particularly the extensions 37 thereof, are normally engaged with the substantially parallel side edges of leg 22 of the bracket 21.

To clamp a display or other flat work 40 into the clamp 20, the user grasps the outer ends of the clamp arms 30 and squeezes them toward each other. The upper edge of the placard is then placed against the under surface of leg 23, with the placard surface engaging the inner surface of the leg 22, and the arms 30 are then released. The coil spring 34 pivots the arm 30 so that the enlargements 37 of the abutments 36 engage the outer surface of the placard and firmly hold the same pressed against the inner surface of leg 22. This firmly clamps the placard in position to extend parallel to leg 22, and the placard may be released easily by simply grasping and squeezing the outer ends of the arms 30.

While a specific embodiment of the invention has been shown and described in detail to illustrate the application of the invention principles, it will be understood that the invention may be embodied otherwise without departing from such principles.

What is claimed is:

1. A work support clamp, for an easel or the like, comprising, in combination, an element having a substantially planar work engaging surface and formed with mounting means constructed for adjustable connection to a support means; a pair of clamp arms commonly pivoted on said element on an axis parallel to and spaced from said planar surface for swinging movement in a direction susbtantially perpendicular to said planar surface, said clamp arms carrying abutment means engageable with the outer surface of substantially flat work engaged with said planar surface; and spring means biasing said clamp arms to engage said abutment means with such work to clamp the latter against said planar surface; said element being an angle having a pair of substantially flat legs, one of said legs having said substantially planar work-engaging surface, and the other of said legs serving as the pivotal mounting for said clamp arms; said clamp arms being pivoted to move over the outer surface of said other leg, and having lateral extensions intermediate their ends carrying said abutment means, said lateral extensions extending from said clamp arms inwardly toward such one leg and, in the released position of said clamp, engaging said abutment means with a pair of edges of said one leg, at a location inwardly of said other leg.

2. A work support clamp, for an easel or the like, comprising, in combination, an element having a substantially planar work engaging surface and formed with mounting means constructed for adjustable connection to a support means; a pair of clamp arms commonly pivoted on said element on an axis parallel to and spaced from said planar surface for swinging movement in a direction substantially perpendicular to said planar surface, said clamp arms having lateral extensions carrying abutment means engageable with the outer surface of substantially flat work lying against said planar surface; and spring means biasing said clamp arms to engage said abutment means with such work to clamp the latter against said planar surface; said clamp arms extending substantially rectilinearly from said pivot in a direction outwardly from said planar surface; and said extensions extending at an angle from said clamp arms intermediate the ends of the latter and generally toward said planar surface; whereby the free ends of said clamp arms constitute operating means for releasing said clamp.

3. A work support clamp as claimed in claim 1, in which said clamp arms are mating mirror copies of each other, and each clamp arm includes an inner substantially circular end, the two inner ends being hollow and conjointly forming a chamber receiving a coil spring constituting said spring means; the respective ends of the coil spring extending outwardly through said clamp arms which are hollow to receive said spring ends.

4. A work support clamp as claimed in claim 3, in which said one leg is formed with a pair of ears bent outwardly therefrom, to constitute said mounting means, and apertured to receive a bolt or the like for adjustably connecting said clamp to support means.

5. A work support clamp as claimed in claim 3, in which abutment means comprises enlargements on the free ends of said extensions, and said one leg is substantially rectangular and has a pair of opposite edges engaged by said abutment means in the released position of said clamp.

References Cited in the file of this patent
UNITED STATES PATENTS

| | | |
|---|---|---|
| 423,934 | Lathrop | Mar. 25, 1890 |
| 630,900 | Kohl | Aug. 15, 1899 |
| 1,558,770 | Anderson | Oct. 27, 1925 |
| 2,460,701 | Malaspina | Feb. 1, 1949 |

FOREIGN PATENTS

| | | |
|---|---|---|
| 372,950 | Germany | Apr. 6, 1923 |